US009447313B2

(12) United States Patent
Weinstein et al.

(10) Patent No.: US 9,447,313 B2
(45) Date of Patent: Sep. 20, 2016

(54) HYDRATION SYSTEM FOR HYDRATING AN ADDITIVE AND METHOD

(71) Applicants: Jeremy Lynn Weinstein, Tomball, TX (US); Richard Wheeler, Crosby, TX (US); Bryan Scott Lambert, The Woodlands, TX (US)

(72) Inventors: Jeremy Lynn Weinstein, Tomball, TX (US); Richard Wheeler, Crosby, TX (US); Bryan Scott Lambert, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 263 days.

(21) Appl. No.: 13/911,227

(22) Filed: Jun. 6, 2013

(65) Prior Publication Data

US 2014/0364344 A1  Dec. 11, 2014

(51) Int. Cl.
*B01F 5/10* (2006.01)
*C09K 8/68* (2006.01)
*B01F 3/12* (2006.01)
*B01F 5/06* (2006.01)
*C09K 8/88* (2006.01)
*C09K 8/90* (2006.01)

(52) U.S. Cl.
CPC .............. *C09K 8/68* (2013.01); *B01F 3/1271* (2013.01); *B01F 5/0606* (2013.01); *B01F 5/10* (2013.01); *C09K 8/685* (2013.01); *C09K 8/885* (2013.01); *C09K 8/90* (2013.01)

(58) Field of Classification Search
CPC .......... B01F 5/10; B01F 5/102; B01F 5/106; B01F 5/00
USPC ........ 366/16–20, 152.1, 152.2, 153.1, 152.6, 366/160.1–160.3, 162.1, 182.1, 173.1, 366/173.2, 181.6, 136, 137; 137/3, 88, 91
See application file for complete search history.

(56) References Cited

U.S. PATENT DOCUMENTS

| 2,534,792 A | 12/1950 | Nevins, et al. |
| 3,894,084 A | 7/1975 | Werges et al. |
| 3,997,445 A * | 12/1976 | Hannestad ......... B01D 11/0457 210/319 |
| 4,099,005 A | 7/1978 | Fullington et al. |

(Continued)

FOREIGN PATENT DOCUMENTS

| CA | 2550988 C | 12/2008 |
| EP | 0845291 A | 6/1998 |
| WO | WO 201419713 A1 * | 12/2014 ............... C09K 8/68 |

OTHER PUBLICATIONS

Hobbs, et al, "The mechanics of hydrothermal systems: II. Fluid mixing and chemical reactions" Ore Geology Reviews, vol. 49, Dec. 2012, pp. 45-71, http://dx.doi.Or/10.1016/j.oregeorev.2012.08.002.

(Continued)

*Primary Examiner* — Charles Cooley
(74) *Attorney, Agent, or Firm* — Cantor Colburn LLP

(57) ABSTRACT

A hydration system configured to selectively enable a continuous process or a batch process of an additive for a hydraulic fracturing fluid, the hydration system including a hydration tank having a plurality of compartments, wherein the hydration tank is configured to enable movement of a material through the plurality of compartments in the continuous process. The hydration tank is configured to substantially restrict movement of the material between the plurality of compartments in the batch process. Also included is a method of selectively hydrating an additive in a batch process or a continuous process using a hydration system configured to enable both the batch process and the continuous process.

18 Claims, 2 Drawing Sheets

(56) References Cited

U.S. PATENT DOCUMENTS

| | | | |
|---|---|---|---|
| 4,305,463 A | 12/1981 | Zakiewicz | |
| 4,425,227 A | 1/1984 | Smith | |
| 4,579,578 A | 4/1986 | Cooke | |
| 4,622,155 A | 11/1986 | Harris et al. | |
| 4,716,932 A | 1/1988 | Adams, Jr. | |
| 4,846,582 A | 7/1989 | Davidson | |
| 5,046,855 A * | 9/1991 | Allen | B01F 13/10 137/605 |
| 5,052,486 A | 10/1991 | Wilson | |
| 5,064,582 A | 11/1991 | Sutton et al. | |
| 5,103,908 A * | 4/1992 | Allen | B01F 3/04836 166/285 |
| 5,114,239 A * | 5/1992 | Allen | B01F 3/04836 366/136 |
| 5,190,374 A | 3/1993 | Harms et al. | |
| 5,382,411 A | 1/1995 | Allen | |
| 5,426,137 A | 6/1995 | Allen | |
| 5,964,295 A | 10/1999 | Brown et al. | |
| 6,494,932 B1 | 12/2002 | Abercrombie | |
| 6,802,638 B2 | 10/2004 | Allen | |
| 6,817,376 B2 | 11/2004 | Morgan et al. | |
| 7,029,165 B2 | 4/2006 | Allen | |
| 7,066,586 B2 | 6/2006 | da Silva | |
| 7,104,328 B2 | 9/2006 | Phillippi et al. | |
| 7,284,898 B2 * | 10/2007 | Duell | B01F 3/1221 366/136 |
| 7,419,296 B2 | 9/2008 | Allen | |
| 7,581,872 B2 | 9/2009 | Allen | |
| 7,690,429 B2 | 4/2010 | Creel et al. | |
| 7,790,774 B1 | 9/2010 | Kinsey et al. | |
| 7,794,135 B2 * | 9/2010 | El Kholy | B01F 3/1271 366/141 |
| 7,810,986 B2 | 10/2010 | Landers et al. | |
| 7,866,881 B2 * | 1/2011 | El Kholy | B01F 3/1271 366/163.2 |
| 7,888,294 B2 | 2/2011 | Weinstein et al. | |
| 7,913,762 B2 | 3/2011 | Wheeler et al. | |
| 7,972,998 B2 | 7/2011 | Dessinges et al. | |
| 8,043,999 B2 | 10/2011 | Sullivan et al. | |
| 8,044,000 B2 | 10/2011 | Sullivan et al. | |
| 8,141,640 B2 | 3/2012 | Abad et al. | |
| 8,162,050 B2 | 4/2012 | Roddy et al. | |
| 8,297,377 B2 | 10/2012 | Zupanick | |
| 8,347,959 B2 | 1/2013 | Suarez-Rivera et al. | |
| 8,393,390 B2 | 3/2013 | Gupta et al. | |
| 8,397,816 B2 | 3/2013 | Abad et al. | |
| 8,517,102 B2 | 8/2013 | Sullivan et al. | |
| 8,579,028 B2 | 11/2013 | Nguyen et al. | |
| 8,641,266 B2 * | 2/2014 | McIntire | B01F 3/1221 366/137 |
| 8,851,179 B2 | 10/2014 | DeFosse et al. | |
| 8,899,823 B2 * | 12/2014 | Oldham | C09K 8/62 366/136 |
| 8,955,430 B2 | 2/2015 | LeBlanc et al. | |
| 9,022,120 B2 | 5/2015 | Zamora et al. | |
| 9,027,646 B2 | 5/2015 | Svarczkopf et al. | |
| 2003/0117890 A1 * | 6/2003 | Dearing | E21B 21/062 366/182.2 |
| 2003/0150494 A1 * | 8/2003 | Morgan | B01F 3/0861 137/574 |
| 2003/0196809 A1 | 10/2003 | Willberg et al. | |
| 2004/0008571 A1 | 1/2004 | Coody et al. | |
| 2005/0067351 A1 | 3/2005 | Graham | |
| 2008/0264641 A1 | 10/2008 | Slabaugh et al. | |
| 2009/0323464 A1 * | 12/2009 | McIntire | B01F 3/1221 366/168.1 |
| 2010/0046316 A1 | 2/2010 | Hughes et al. | |
| 2010/0246318 A1 | 9/2010 | Kholy et al. | |
| 2011/0003720 A1 | 1/2011 | Sullivan | |
| 2012/0231982 A1 | 9/2012 | Weinstein et al. | |
| 2013/0142006 A1 * | 6/2013 | Saffioti | B29B 7/60 366/153.3 |
| 2014/0051610 A1 | 2/2014 | Perry et al. | |
| 2014/0364344 A1 * | 12/2014 | Weinstein | C09K 8/68 507/219 |
| 2015/0133348 A1 * | 5/2015 | Oldham | C09K 8/62 507/211 |

OTHER PUBLICATIONS

Bueche, F.; "Mechanical Degradation of High Polymers"; (1960) vol. IV, Issue No. 10; 6 pages.

Notification Concerning Transmittal of International Preliminary Report on Patentability;PCTUS2014/035623; The Internatinal bureau of WIPO; Mailed Dec. 17, 2015; 6 pages.

International Search Report and the Written Opinion of the International Searching Authority; PCT/US2014/035615; Date of Mailing Sep. 1, 2014; 12 pages.

* cited by examiner

US 9,447,313 B2

HYDRATION SYSTEM FOR HYDRATING AN ADDITIVE AND METHOD

BACKGROUND

In the drilling and completion industry, the formation of boreholes for the purpose of production or injection of fluid is common The boreholes are used for exploration or extraction of natural resources such as hydrocarbons, oil, gas, water, and alternatively for $CO_2$ sequestration. To increase the production from a borehole, the production zone can be fractured to allow the formation fluids to flow more freely from the formation to the borehole. The fracturing operation includes pumping fluids, such as water, at high pressure and high rate towards the formation to form formation fractures. To retain the fractures in an open condition after fracturing pressure is removed, the fractures must be physically propped open, and therefore the fracturing fluids commonly include solid granular materials, such as sand, generally referred to as proppants.

In addition to proppants and water, other components of the fracturing fluid can include friction reducing additives to allow fracturing fluids and proppant to be pumped to a target zone at a higher rate and reduced pressure. The treatment design generally requires the fluid to reach maximum viscosity as it enters the fracture. The requisite viscosity is typically obtained by the gelation of viscosifying polymers and/or surfactants in the fracturing fluid. Such additives include synthetically produced and naturally occurring polymers. The selection of additives is based on a number of factors including the makeup of the formation, formation fluids, pumping configurations, and borehole temperatures. The additives can be provided as dry powders and subsequently hydrated at the fracturing site, which saves delivery costs, reduces cost of mixing slurry, and saves space by reducing a footprint required for the additives at the site.

The art would be receptive to improved apparatus and methods for hydrating additives used in the fracturing fluid.

BRIEF DESCRIPTION

A hydration system configured to selectively enable a continuous process or a batch process of an additive for a hydraulic fracturing fluid, the hydration system including a hydration tank having a plurality of compartments, wherein the hydration tank is configured to enable movement of a material through the plurality of compartments in the continuous process, and the hydration tank is configured to substantially restrict movement of the material between the plurality of compartments in the batch process.

A method of selectively hydrating an additive in a batch process or a continuous process using a hydration system configured to enable both the batch process and the continuous process, the method including when the additive is a first additive, delivering the first additive to a first compartment in the hydration tank and continuously hydrating the first additive through a plurality of compartments in the hydration tank in the continuous process prior to releasing the first additive via a last compartment in the hydration tank; and, when the additive is a second additive different from the first additive, delivering the second additive to at least one of the first compartment and the last compartment, hydrating the second additive within the hydration tank in the batch process while restricting movement of the second additive between the plurality of compartments in the hydration tank, and releasing the second additive via the at least one of the first and last compartments.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
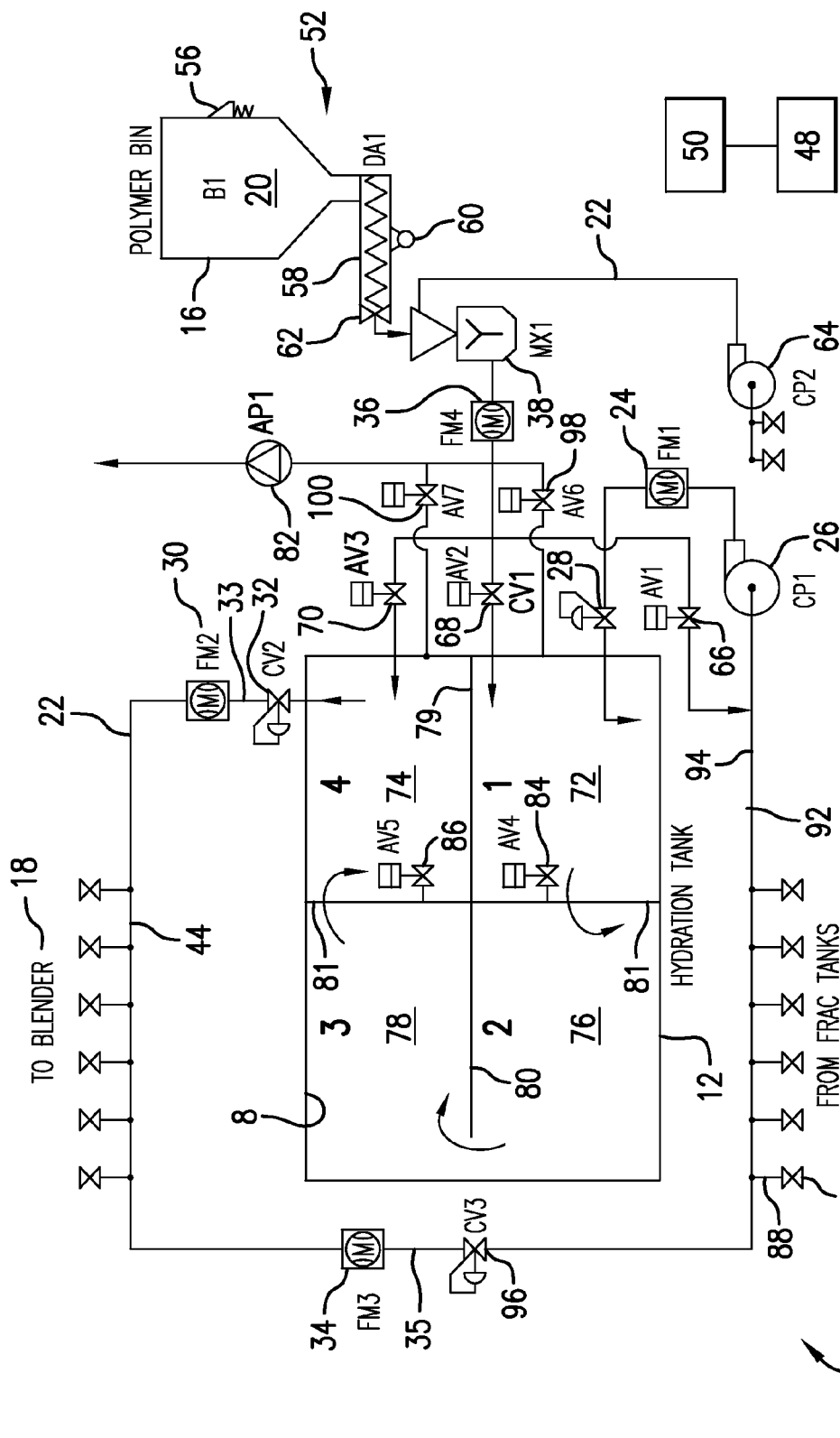
FIG. 1 shows a diagram of an exemplary embodiment of a hydration system.

A detailed description of one or more embodiments of the disclosed apparatus and method are presented herein by way of exemplification and not limitation with reference to the Figures.

Exemplary embodiments of a multi-polymer stimulation hydration system are provided that have the capability of mixing and hydrating multiple different types of dry additives. The hydration systems incorporate the capacity to calibrate feeders to meter a variety of dry powders. They further incorporate a mixer, which will disperse and or grind powders to minimize hydration time for each dry additive polymer. The hydration systems as described herein further incorporate the ability to either hydrate in batches or to hydrate as part of a continuous process depending on the specific hydration requirements of the dry additive polymer.

The dry additives may be viscosifying agents such as synthetic or natural polymers. Hydratable polymers include those containing one or more functional groups, such as a hydroxyl, carboxyl, sulfate, sulfonate, amino or amido group. Preferred synthetic and natural polymers include polysaccharides, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Other suitable polysaccharides and derivatives are those which contain one or more monosaccharide units of galactose, fructose, mannose, glucoside, glucose, xylose, arabinose, glucuronic acid and pyranosyl sulfate. These include guar gums and derivatives thereof, locust bean gum, tara, xanthan, succinoglycan, scleroglucan and carrageenan.

Preferred viscosifying polymers may include crosslinkable polysaccharides, such as guar gums and derivatives, cellulose, starch, and galactomannan gums. Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

Specific examples of polysaccharides useful with the present invention include, but are not limited to, guar gum, hydroxypropyl guar, carboxymethylhydroxypropyl guar and known derivatives of these gums.

The polymers, whether natural or synthetic may be introduced to a mixer as a dry powder. The polymers are referred to herein as additives. When mixed by the mixer, the additives may more specifically be referred to herein as mixed additives, and when the additives are hydrated by the hydration tank they may be referred to herein as hydrated additives. The hydrated additives are gels, and thus are also referred to herein as hydrated gels or gel concentrates when they exit the hydration tank. In any part of the process, the additive may also be generically referred to as "materials" which incorporate any or all of the dry additive and the fluid mixed with the additive. The polymer can be pumped at job concentration, blended in a continuous dilution process, or injected into the system as a concentrate. Exemplary embodiments of the hydration system described herein are capable of both batch processing and continuous processing. Batch processing is a method of allowing an additive to hydrate over time without moving the additive between compartments within the hydration tank. Batch processing can be effective and precise and is needed for additives with extended hydration times. Continuous processing is a method of moving an additive through the hydration tank and allowing it to hydrate over the course of time in which it travels through the hydration tank. Also, certain materials lend themselves to batch processing while other materials lend themselves to continuous processing. For example, polysaccharide base polymers perform well in the continuous process, while synthetically produced polymers, which generally take longer to hydrate, may be better suited to a batch processing method. As will be further described below, the hydration system described herein is also capable of performing a continuous dilution process where the fracturing fluid is mixed at a concentration higher than that required for the job design, then hydrated, and then subsequently diluted on-board the system.

As shown in FIG. 1, the hydration system 10 is configured to hydrate dry powder additive 20, such as a dry polymer, for use in hydraulic fracturing and includes a hydration tank 12, a liquid source 14 (frac tanks), and a bulk storage tank 16 containing a first additive 20. A proppant source (not shown) may be further included as needed for the fracturing fluid, and may be introduced to a blender 18. The hydration system 10 is locatable at a surface of a fracturing site and can be mounted on a trailer for transportability. Different methods of hydrating the additive 20 will be described herein, all of which are enabled through the use of the hydration system 10. When the desired hydration level of the additive 20 is obtained, the hydrated additive is provided to the blender 18 which receives the hydrated additive and may blend it with additional water, proppant, or other additives as needed. After being processed by the blender 18, the fracturing fluid is ready for use in a fracturing operation and is delivered to the borehole using a pressurizing pumping apparatus (not shown).

Figure 2:
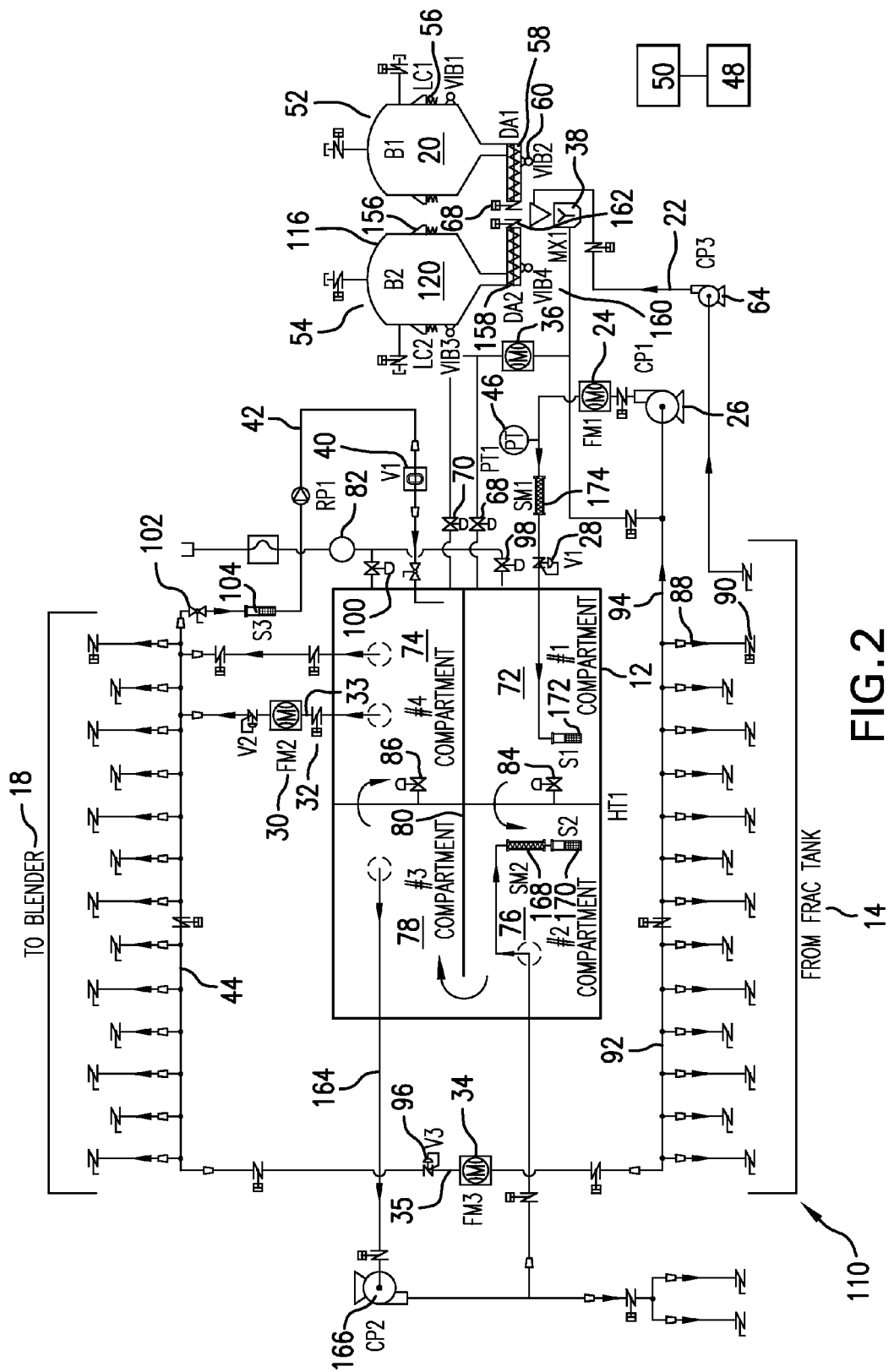
FIG. 2 shows a diagram of an alternate exemplary embodiment of a hydration system.

Lines connecting components of the hydration system 10 indicate piping 22 capable of passing fluidic materials through the hydration system 10, as allowed for by the opening and closing of various valves located in the hydration system 10. A power source 48 and control system 50 may be further incorporated into the hydration system 10. The control system 50 may be used to automate certain procedures within a method of hydrating the additives 20 and to operate certain control elements, such as the valves, within the hydration system 10. The control system 50 may be managed or operated by an operator or configured for automated control, or both. The control system 50 may, for example, control the amounts and rates of elements combined for the fracturing fluid, and may also monitor elements of the hydration system 10 such as, but not limited to, flow meters, viscometers, pressure transmitters, sensors, etc. The flow meter may be a magnetic flowmeter to determine the flow rate within a particular portion of the piping 22 in the system 10. For example, in the illustrated hydration system 10, a first flow meter 24 is positioned on a portion of the piping 22 between a first pump 26 and a first control valve 28, a second flow meter 30 is positioned downstream a second control valve 32 on piping 22 exiting the hydration tank 12, a third flow meter 34 is positioned on piping 22 from the frac tank 14 to the blender 18, and a fourth flow meter 36 is positioned on piping 22 coming out of mixer 38. A viscometer is used to measure the viscosity of a fluid under one fluid condition. As shown in FIG. 2, a viscometer 40 is located within a rheology loop 42 to verify viscosity of the hydrated additive delivered to the header 44 of the blender 18.

A first dry additive handling system 52 is shown in FIG. 1. As will be further described below with respect to FIG. 2, a second dry additive handling system 54 can also be included. The first dry additive handling system 52 includes the bulk storage tank 16 (polymer bin) that is filled or re-filled with the first dry additive 20. The bulk storage tank 16 may include load sensors 56, otherwise known as load cells, which are transducers that convert force into a measurable electrical output, to measure the amount of bulk material (additive) by weight contained in the bulk storage tank 16, thus providing an indication of an amount of the first dry additive 20 remaining in the bulk storage tank 16 as well as an indication of the rate of change in the weight, which information is usable to indicate how much of the first additive 20 is metered out of the bulk storage tank 16. A conveyor 58, such as a dry additive feeder screw or auger, to meter the additive 20 contained within the bulk storage tank 16, is arranged adjacent an exit of the bulk storage tank 16. A vibrator 60 may also be associated with the conveyor 58. A valve 62, such as butterfly valve, may be additionally arranged relative to the exit of the bulk storage tank 16 and/or the exit of the conveyor 58 to selectively deliver a quantity of the additive 20 to the mixer 38.

The mixer 38 is positioned adjacent an exit of the conveyor 58, or alternatively a hopper (not shown) may be arranged at an exit of the conveyor 58 to subsequently deliver the first additive 20 from the hopper to the mixer 38. The mixer 38 is provided with shear characteristics suitable for use with the first additive 20. As the hydration system 10 is suitable for the hydration of both natural and synthetic polymers, the mixer 38 also accommodates both natural and synthetic polymers. The mixer 38 thus provides a broad range of shear rates in order to accommodate different polymers, some of which are adequately mixed with lower shear, such as guar, and others that require a high level of shear, such as polyacrylamide. The mixer 38 may be a rotor-stator type of mixer, with an inlet to receive the additives, and an outlet to discharge the components that are mixed. Mixed with the first additive 20 is liquid, such as water, pumped by a second pump 64, such as a centrifugal pump. The second pump 64 delivers water from frac tanks 14 to the mixer 38 at about 100 to about 300 gallons per minute ("GPM"). The mixer 38 agitates and mixes the dry first additive 20 and the water, such as by using an impeller or other agitator blades within the mixer 38. By mixing the dry first additive 20 with water, production time of the first additive 20 is decreased by increasing a surface area of the powder particles so that the particles are wetted more quickly.

After the water and the first additive 20 are mixed in the mixer 38, the fourth flow meter 36 determines the flow rate exiting the mixer 38, and via the control system 50 or operator input, a determination is made whether to deliver the mixed additive 20 to a compartment of the hydration tank 12 for batch processing or delivered to an input of the first centrifugal pump 26 to change the flow rate of the mixed additive delivered to the hydration tank 12. The control valve 28 may adjust the flow rate of the additive 20 and water mixture and pump the mixture to the hydration tank 12 at a rate from 0 GPM up to approximately 4,000 GPM. The destination of the mixed additive from the mixer 38 is determined via actuation of valving on the piping 22. That is, the mixed additive from the mixer 38 is passed through either a first actuated valve 66 to be input to the centrifugal pump 26, passed through a second actuated valve 68 to be input to a first compartment 72 of the hydration tank 12, or passed through a third actuated valve 70 to be input to a last compartment 74 of the hydration tank 12.

The hydration tank 12 will now be described in sufficient detail to understand the methods of hydration enabled by the hydration system 10. The hydration tank 12 having an inner wall 8 is multi-compartmented and is illustrated as including four compartments 72, 74, 76, 78 separated by weirs 80, 81 and wall 79 which are arranged to alter the flow path of the mixed additive within the hydration tank 12. The arrangement of weirs 80, 81, wall 79, and compartments 72, 74, 76, 78 extend a time period for the mixed additive to travel through the hydration tank 12 while the mixed additive is hydrated therein in the continuous process of hydration. A first compartment 72 is in direct receipt of mixed additive from the mixer 38 or mixed additive and/or water from the first pump 26. The first compartment 72 can either deliver the contents therein to an additive pump 82 or to the second compartment 76 over the weir 81. The first and second compartments 72, 76 may be separated by a fourth actuated valve 84, such as a sliding gate or isolation gate valve, which remains closed during the hydration processes described herein and need only be opened if the tank 12 is to be fully drained. The first and fourth compartments 72 and 74 are separable by wall 79. The second and third compartments 76, 78 are separated by the weir 80 and the hydration system 10 can use the second and third compartments 76, 78 to adjust the shear of the mixed and hydrated additive as will be further described below with respect to FIG. 2. The weir 80 between the second and third compartments 76, 78 may have an effective length shorter than a length of the compartments 76, 78 at their intersection, allowing the material from the second compartment 76 to move around the weir 80 into the third compartment 78. Third and fourth compartments 78, 74 are separated by weir 81 and may further include a fifth actuated valve 86, such as a sliding gate or isolation gate valve, for drainage of the tank 12 as noted above. The weirs 81 between the first and second compartments 72, 76, and the third and fourth compartments 78, 74 have a length that spans the full length of the compartments 72, 76 and 78, 74 at their intersections. These weirs 81 are arranged such that only flow over the weirs 81, as opposed to around the weirs 81, is possible. That is, these weirs 81 restrict access between the respective adjacent compartments until the material level is above the height of the weirs 81. The fourth compartment 74 is either in direct receipt of mixed additive from the mixer 38 via the third actuated valve 70 or in receipt of the gel concentrate (the mixed additive at least partially hydrated in the hydration tank 12) from the third compartment 78 and can either deliver the contents therein to the additive pump 82 or to the output header 44 to the blender 18 via second control valve 32. While four compartments 72, 74, 76, 78 have been illustrated, additional compartments may be provided, such as one or more additional compartments between the second and third compartments 76, 78 to increase the time the mixed additive travels through the hydration tank 12, thus increasing a time for hydration. In view of the possibility of the hydration tank 12 being configured with an alternate number of compartments, the fourth compartment 74 is alternately termed a "last" compartment.

The frac tanks 14 store a source of liquid, such as water. A plurality of pipes 88 outfitted with butterfly valves 90, such as manually operated and/or pneumatically actuated butterfly valves, extend from the frac tanks 14 and provide the water to a header 92, which serves as an input header 92 for the hydration system 10. In one exemplary embodiment, the pipes 88 from the frac tank 14 are about four inches in diameter, while the input header includes a pipe 94 of about 12 inches in diameter, however different sized pipes 88, 94 may be used as long as the quantity of water and necessary pressure within the hydration system 10 are met. The input header 92 can also include one or more valves, such as pneumatically actuated butterfly valves, that when opened, directs water to the first pump 26, the second pump 64, or the output header 44. The water (and the mixed additive) from the first pump 26 is directed to the first compartment 72 via the first flow meter 24 and first control valve 28. Water is also directable to the mixer 38, such as by opening one or more valves on pipes 88 from the frac tank 14, and sending the water to the mixer 38 through the second pump 64. Via a third control valve 96 and the third flow meter 34, the water can also be directed from the input header 92 to the output header 44 to the blender 18. The directing of water from the input header 92 to the output header 44 is useful in a continuous dilution process, as will be described further below.

A method of hydrating dry first additive 20 in a continuous process using the hydration system 10 will now be described. Although not limited thereto, continuous processing is particularly useful for natural additives, such as polysaccharide base polymers including guar-based additives. In the continuous process, the fourth and fifth actuated valves 84, 86 are closed such that flow over and around the weirs 80, 81 in the hydration tank 12 is possible. The dry additive feeder, conveyor 58, includes a screw size suited to the particular additive 20 and a selected quantity of the additive 20 is added to the mixer 38 and mixed with a selected quantity of water from the second pump 64. Via the fourth flow meter 36 and the first actuated valve 66, the mixed additive is pumped to the first compartment 72 through the first pump 26. The first flow meter 24 monitors the flow from the first pump 26 and the first control valve 28 allows or prevents the delivery of the mixed first additive into the first compartment 72. After the mixed additive has resided in the first compartment 72 for a period of time, it is passed through to the second compartment 76, and subsequently to the third and fourth compartments 78, 74. In the illustrated embodiment, in the continuous process, the flow through the tank 12 is from the first compartment 72 over the weir 81 to the second compartment 76, around the corner of weir 80 to the third compartment 78, and over the weir 81 to the fourth compartment 74. Continuous pumping of the material into the first compartment 72, as controlled by control valve 28, assists in pushing the material through the hydration tank 12. After the mixed additive is thoroughly hydrated it is released from the fourth compartment 74, or the last compartment if there is an alternate number of compartments in the hydration tank 12. The second control valve 32 allows or prevents exit of the hydrated additive from the fourth compartment 74 and the second flow meter 30 monitors the flow to the output header 44. As the hydrated additive/gel is produced, the gel first to enter the hydration tank 12 is also the first gel to leave the hydration tank 12 after passing through the multiple compartments 72, 76, 78, 74 such that only the most hydrated gel is withdrawn from the hydration tank 12 first.

A method of hydrating a dry additive in a batch process using the hydration system 10 will now be described. Although not limited hereto, batch processing is useful for synthetic additives, such as synthetically produced polymers, which often require a longer hydration time. The dry additive feeder or conveyor 58 includes a screw size suited to the particular additive and a selected quantity of the first additive 20 is added to the mixer 38 and mixed with a selected quantity of water from the second pump 64. The mixed additive is monitored by the fourth flow meter 36, and then one or both of the second and third actuated valves 68, 70 is opened to allow the mixed additive to be delivered to one or both of the first compartment 72 and the fourth or last compartment 74, depending on the quantity of additive 20 required to be hydrated. Material in the first compartment 72 is separated from material in the fourth compartment 74 by the wall 79. The fourth and fifth actuated valves 84, 86 remain closed in the batch process method. When the batch of additive is hydrated within the first compartment 72, the hydrated additive/gel concentrate is released via a sixth actuated valve 98 to the additive pump 82. Likewise, when the batch of additive is hydrated within the fourth compartment 74, the hydrated additive/gel concentrate is released via a seventh actuated valve 100 to the additive pump 82. Thus, during batch operation, the additive 20 will be added to the tank 12 in a ratio according to flow through the fourth flow meter 36, while during continuous operation, the additive 20 will be added to the tank 12 in a ratio according to flow through the first flow meter 24.

A continuous dilution process using the hydration system 10 will now be described. The mixed additive and liquid (water), hereinafter "mixed additive," is delivered to the hydration tank 12 for hydration at concentrations higher than that required for execution of a specific fracturing process. The hydration tank 12 provides the mixed additive with sufficient residence time therein to achieve the required level of hydration. Once the mixed additive is hydrated to a viscous fluid, the viscous fluid exits the hydration tank 12 via a viscous fluid line 33. Along the viscous fluid line 33 are the second flowmeter 30, a viscous fluid flowmeter, and the second control valve 32, a viscous fluid control valve. The second flow meter 30 measures the flow rate of the viscous fluid in the viscous fluid line 33 and the second control valve 32 throttles the viscous fluid flow to provide the precise amount of viscous fluid required by job parameters. A diluent line 35, from the frac tanks 14 to the output header 44 (or first to a dilution manifold that precedes the output header 44), directs a stream of diluent (water) to the output header 44. The diluent line 35 is separate from the other lines in the system. The third control valve 96, a diluent flow control valve, is throttled to introduce diluent (water) to the dilution manifold. The viscous fluid line 33 sends the proper amount of viscous fluid to the dilution manifold so as to be diluted with diluent from the dilution line 35 via the second flow meter 30, second control valve 32, and third control valve 96.

The dilution manifold may include a dilution manifold header and a plurality of valves that prevent or allow flow from the dilution manifold to the output header 44 which may also include a number of valves that prevent or allow flow from the dilution manifold to the output header 44. An additional valve may be provided on the dilution manifold header or output header 44 to separate the diluent line 35 from the viscous fluid line 33 as necessary. The diluted viscous fluid within the dilution manifold having the proper ratio of additive to diluent flows into the output header 44 and is subsequently pumped to the blender 18. A flowmeter (not shown) can be employed to monitor the flow of the diluted viscous fluid in the line between the pump and the blender 18 and can be used to determine if the ratio between additive and water is correct. In such an arrangement, the third flow meter 34 would not be necessary. That is, by using only two control valves 32, 96 and flow meter 30, the viscous fluid dilution system is configured ensure the proper ration between the viscous fluid with the diluent. The control valves 32, 96 are configured to adjust the available net positive suction head from the two reservoirs (the frac tanks 14 and the hydration tank 12) to achieve the proper fluid ratio. While an additional flow meter 34 may be utilized on the diluent line 33, such an additional flow meter would be redundant because a flowmeter at the blender 18 will determine if the proper ratio is being established between the water and the viscous fluid from the hydration tank 12. That is, it is not necessary to measure the rate of the diluent stream in the diluent line 35 because only a single flow component (flow of viscous fluid in the viscous fluid line 33) and the total rate (flow rate of the diluted viscous fluid sent to the blender 18) need to be measured.

An operator may enter the particular ratio of additive to water required for a fracturing fluid to be added to the blender 18, and the control system 50 may then automatically monitor the flow meter 30 and flow meter at the blender 18 and throttle the control valves 32 and 96 as necessary to achieve the correct ratio of additive to water within the dilution manifold and/or output header 44. In operation, a concentrated fluid is mixed by the mixer 38 and directed to the hydration tank 12. The hydration tank 12 hydrates the concentrated fluid to provide a viscous fluid to the viscous fluid line 33, which is metered using the control valve 32 and flowmeter 30. By example only, a heavy gel 40 lb/1000 gal can be mixed into the hydration tank 12 at 60 bbl/min. The heavy gel can be subsequently diluted to 24 lb/1000 gal at 100 bbl/min at the blender 18. The extra 40 bbl/min flows through the diluent line 35, which serves as a clean water crossover.

As can be readily understood from a review of FIG. 1, the viscous fluid exiting the hydration tank 12 is not pumped to the dilution manifold and/or output header 44 and an additional pump is not required to meter the viscous fluid. Instead, the viscous fluid is directed to the output header 44 to be subsequently diluted by the added diluent (water) from diluent line 35 solely by gravity. That is, energy for the movement of the viscous fluid, as well as the diluent, would be solely dependent upon gravity. The absence of a pump eliminates the cost of a pump as well as the footprint required by a pump. Moreover, the elimination of a pump enables the use of shear sensitive polymers within the viscous fluid dilution process, such as but not limited to polyacrylamides (a polymer formed from acrylamide sub units), copolymers of acrylamides, and terpolymers of acrylamides, that would otherwise be damaged and/or deleteriously affected by shear from a pump. The pumpless viscous fluid line 33 has a shear of approximately 200 (l/s) from the hydration tank 12 to the output header 44 (less than a lower limit of shear in a centrifugal pump) such that the system 10 is capable of processing such shear sensitive polymers.

While the hydration system 10 has been described which utilizes the hydration tank 12 and blender 18, the mixed additive exiting the mixer 38 could also be stored for subsequent use without passing through the hydration tank 12. Also, the hydrated additive/gel concentrate exiting the hydration tank 12 could be stored for subsequent use without passing to the blender 18.

Turning now to FIG. 2, an exemplary embodiment of a hydration system 110 is shown to include most of the same components as the hydration system 10, but with some additional features. Same or substantially same components will be referenced with the same reference number where applicable. The hydration system 110 includes the first bulk storage tank 16, as well as a second bulk storage tank 116 for the send dry additive handling system 54. In an exemplary embodiment of the hydration system 110, the first and second bulk storage tanks 16, 116 include different hydratable polymers. For example, the first bulk storage tank 16 may include a natural polymer as the first additive 20 while the second bulk storage tank 116 includes a synthetically produced polymer as a second additive 120. The second dry additive handling system 54 may include substantially the same features as the first dry additive handling system 52, such as the second bulk storage tank 116, load sensors 156, a dry additive feeder/conveyor 158, vibrator 160, and valve 162. However, the dry additive feeder 158 for the second bulk storage tank 116 should be selected for feeding the second additive 120 included in the second bulk storage tank 116, and thus the dry additive feeder 158 may be different from the dry additive feeder 58. While two dry additive handling systems 52, 54 are depicted within the hydration system 110 shown in FIG. 2, the hydration system 110 could alternatively employ a single storage tank 16 (as shown in FIG. 1) and the feeder screw of the dry additive feeder 58 could be swapped out with a different screw or conveyance system as needed to accommodate different additives. The mixer 38 shown in FIG. 2 is arranged to accept additive 20, 120 from either of the first and second bulk storage tanks 16, 116. As previously described, the mixer 38 is provided with shear characteristics enabling the acceptance of either additive 20, 120.

The hydration system 110 shown in FIG. 2 also demonstrates the use of rheology loop 42 and incorporates viscometer 40 to verify the viscosity of the gel concentrate passing from the fourth (last) compartment 74 to the output header 44. A valve 102 is opened when the viscosity verification is to be made, and a strainer 104 is included within the rheology loop 42.

Further depicted in the hydration system 110 illustrated in FIG. 2 is a recirculation loop 164 that extends between the second and third compartments 76, 78 of the hydration tank 12. The recirculation loop 164 incorporates a third centrifugal pump 166 and is usable to alter the shear of the additive undergoing the continuous hydration process. In an exemplary embodiment, material within the third compartment 78 is pumped back to the second compartment 76 using the pump 166 and passed through a static mixer 168 and strainer 170 before returning to the third compartment 78 via the weir 80 between the second and third compartments 76, 78.

The hydration system 110 is also illustrated as including a strainer 172 within the first compartment 72, and a pressure transmitter 46 and static mixer 174 are employed between the flow meter 24 and control valve 28 on the piping 22 from the pump 26 to the first compartment 72. Thus, while the hydration system 110 substantially incorporates the hydration system 10 therein, it should be understood that various additional features can be added thereon to accommodate additional processes useful in the hydration of additives.

While a certain number of valves have been illustrated, it should be understood that a different quantity of valves would also be within the scope of this disclosure. For example, more or less valves could be employed from the frac tanks 14 and to the blender 18. Likewise, while a particular layout of piping 22 has been illustrated, an alternative layout could be provided so as to be accommodated within the space requirements of a trailer bed, vessel, etc. The hydration systems 10, 110 described herein are capable of producing either a gel concentrate or a finished gel product, capable of accommodating various additives, and capable of hydrating using various processes.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A hydration system configured to selectively enable a continuous process of a first additive or a batch process of a second additive for a hydraulic fracturing fluid, the hydration system comprising:
   a hydration tank having a plurality of compartments including at least a first compartment, a last compartment, and at least one intermediate compartment interposed in a flow path from the first compartment to the last compartment within the hydration tank;
   a first valve arranged to selectively pass the first additive to the first compartment, a second valve arranged to selectively pass the second additive to one compartment amongst the plurality of compartments, a third valve arranged to selectively dispense the first additive in a hydrated state from the last compartment, and a fourth valve arranged to selectively dispense the second additive in a hydrated state from the one compartment amongst the plurality of compartments;
   a first pump arranged to pump the first additive through the first valve to the first compartment to enable movement of the first additive through the at least one intermediate compartment and to the last compartment and the third valve in the continuous process; and,
   a second pump arranged to pump the second additive in a hydrated state out of the one compartment amongst the plurality of compartments and through the fourth valve in the batch process.

2. The hydration system of claim 1 wherein the at least one intermediate compartment includes a second compartment configured to receive the material from the first compartment, and a third compartment configured to receive the material from the second compartment.

3. The hydration system of claim 1 further comprising a weir separating the first compartment from the at least one intermediate compartment, wherein movement of the first additive from the first compartment to the at least one intermediate compartment is prevented until a height of the first additive in the first compartment exceeds a height of the weir.

4. The hydration system of claim 1 further comprising a wall separating the first compartment and the last compartment, wherein the wall is configured to prevent movement of the first additive and the second additive between the first compartment and the last compartment.

5. The hydration system of claim 1 further comprising a diluent line bypassing the hydration tank, and a gravity-driven viscous fluid line exiting the hydration tank, wherein the hydration system is configured to dilute viscous fluid from the hydration tank.

6. The hydration system of claim 1 further comprising a mixer, the first pump connected to the mixer to receive the first additive from the mixer in the continuous process, and the second valve connected to the mixer to receive the second additive from the mixer in the batch process.

7. The hydration system of claim 6, wherein the mixer is configured to receive both a synthetically produced polymer and a natural polymer.

8. The hydration system of claim 1 wherein the one compartment amongst the plurality of compartments is the last compartment, and the last compartment includes a first exit configured to direct the first additive in the hydrated state from the last compartment to the third valve, and a second exit configured to direct the second additive in the hydrated state from the last compartment to the second pump via the fourth valve.

9. The hydration system of claim 1 further comprising an input header configured to selectively direct fluid to the first pump.

10. A method of selectively hydrating an additive in a batch process or a continuous process using the hydration system of claim 1, the method comprising:
when the additive is the first additive, delivering the first additive to the first compartment in the hydration tank and continuously hydrating the first additive through the plurality of compartments in the hydration tank in the continuous process prior to releasing the first additive via the last compartment in the hydration tank; and,
when the additive is the second additive different from the first additive, delivering the second additive to at least one of the first compartment and the last compartment, hydrating the second additive within the hydration tank in the batch process while restricting movement of the second additive between the plurality of compartments in the hydration tank, and releasing the second additive via the at least one of the first and last compartments.

11. The method of claim 10, wherein releasing the first additive via a last compartment in the hydration tank includes directing the first additive to an input header to a blender, and releasing the second additive via the at least one of the first and last compartments includes directing the second additive to the second pump.

12. The method of claim 10, wherein the first additive requires less hydration time within the hydration tank to reach the hydrated state than the second additive.

13. The method of claim 10, further comprising mixing at least one of the first additive and the second additive with fluid in a mixer prior to delivering the at least one of the first additive and second additive to the hydration tank.

14. The method of claim 10, further comprising pumping the first additive into the first compartment when the first additive is to be hydrated in the continuous process.

15. The method of claim 10, wherein, when the first additive is to be hydrated, allowing the first additive to flow over and around weirs between the plurality of compartments, and when the second additive is to be hydrated, retaining the second additive in the at least one of the first and last compartments until hydrated.

16. The method of claim 10 further comprising selectively opening the first valve and pumping the first additive to the first compartment when the first additive is to be hydrated, and selectively opening at least one of the second valve to selectively deliver the second additive to the first compartment and a fifth valve to selectively deliver the second additive to the last compartment when the second additive is to be hydrated.

17. The method of claim 10, further comprising diluting the hydrated first additive using a diluent stream that bypasses the hydration tank, wherein releasing the first additive from the hydration tank includes flowing the first additive within a gravity-driven pumpless viscous fluid line.

18. A hydration system configured to selectively enable a continuous process of a first additive or a batch process of a second additive for a hydraulic fracturing fluid, the hydration system comprising:
a hydration tank having a plurality of compartments including at least a first compartment and a last compartment;
a mixer;
a first valve arranged to selectively deliver the first additive from the mixer to the first compartment, a second valve arranged to selectively deliver the second additive from the mixer to the first compartment, and a third valve arranged to selectively deliver the second additive from the mixer to the last compartment; and,
a first flow meter configured to add the first additive to the first compartment in a ratio according to flow through the first flow meter, and a second flow meter configured to selectively add the second additive to the first and last compartments in a ratio according to flow through the second flow meter;
wherein the first additive is movable through the plurality of compartments from the first compartment to the last compartment in the continuous process, and the second additive is restricted from movement between the plurality of compartments in the batch process.

* * * * *